July 21, 1953     K. R. THOMPSON     2,645,846
ASSEMBLY DEVICE FOR SHOCK ABSORBERS
Filed April 19, 1949
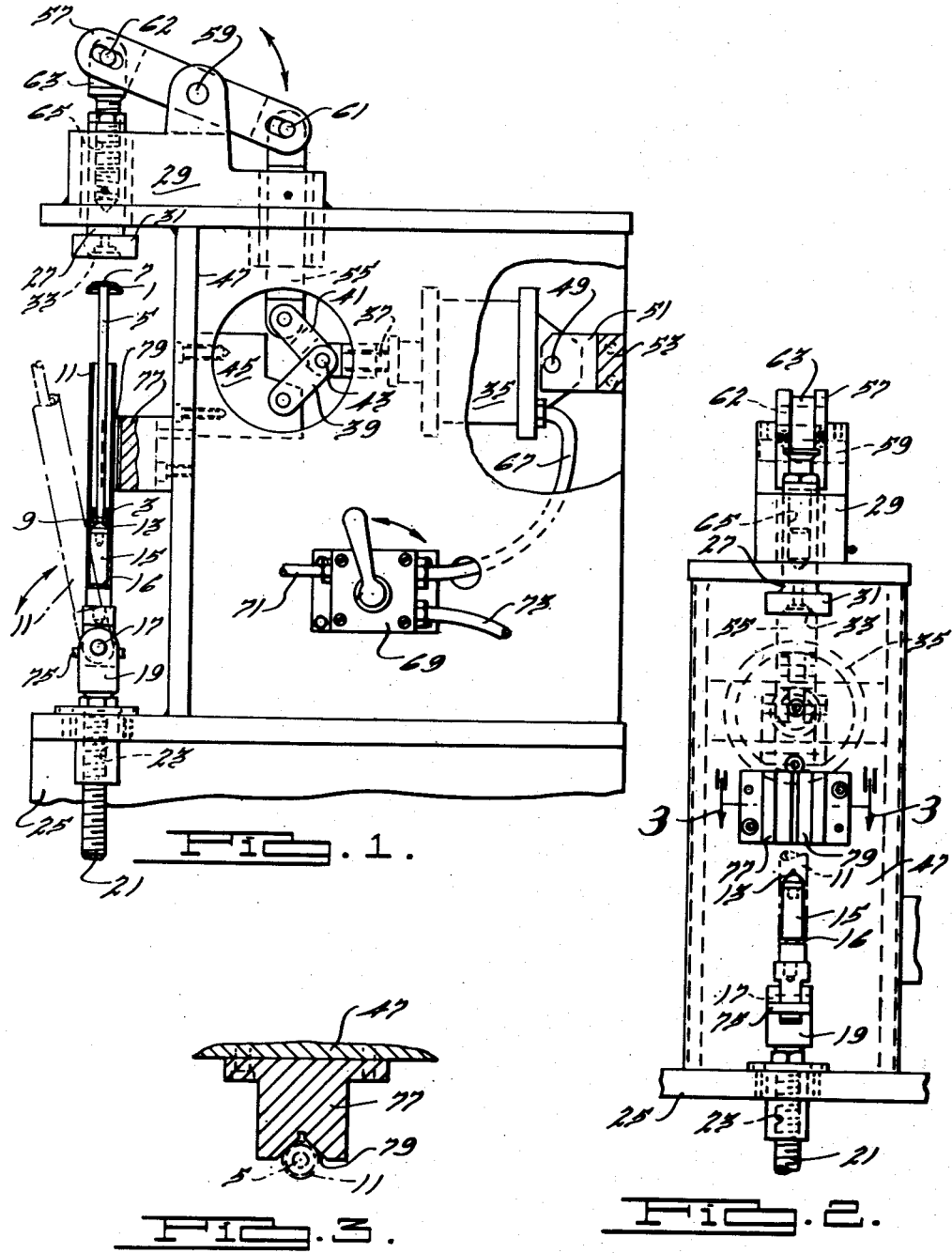
INVENTOR.
Keith R. Thompson
BY
Harness, Dickey & Pierce
ATTORNEYS.

Patented July 21, 1953

2,645,846

UNITED STATES PATENT OFFICE 2,645,846

ASSEMBLY DEVICE FOR SHOCK ABSORBERS

Keith R. Thompson, Monroe, Mich., assignor to Monroe Auto Equipment Company, a corporation of Michigan Application April 19, 1949, Serial No. 88,248

3 Claims. (Cl. 29—244)

This invention relates to the manufacture of shock absorbers and, in particular, refers to apparatus for assembling a dust cap and piston on opposite ends of a shock absorber rod.

The principal object of the invention is to economize and facilitate the assembly of shock absorber parts, especially the attachment of the dust cap and piston to the rod.

Briefly, the invention contemplates the initial preliminary assembly of both parts on opposite ends of the rod. Then, the piston end is inserted in a tubular member, preferably the shock absorber pressure tube, and this member serves as an attachment or locating means to enable an axial force to be applied to the rod. This force is applied, of course, by suitable pads or tools engaging the parts and serves to press them on the rod and, if the tools are so adapted, to stake them in position.

The advantageous features of the invention will be evident upon consideration of the accompanying drawings which illustrate a preferred form of the invention wherein:

Figure 1 is a side elevation of the assembly apparatus with parts in section and parts broken away, Fig. 2 is a front elevation of the apparatus, and Fig. 3 is a section taken on line 3—3 of Fig. 2.

The drawings show apparatus of a preferred form for attaching a cap 1 to the upper end and a piston 3 to the lower end of a rod 5. The cap 1 has a central bore 7 which is press fitted on the rod 5. This is a taper fit so that the cap may be fitted by hand in the end of the rod prior to final assembly in accordance with this invention. The piston 3 which is fitted on the other end of the rod includes a number of elements that are held in desired compressed relation by a nut 9 that is threaded the desired amount on the end of the rod 5 and is to be staked thereto. The simultaneous pressing of the cap 1 and the staking of nut 9 are effected by the application of axial forces to the cap and nut end of the rod in a direction to compress the rod.

It will be appreciated that the preliminary assembly comprising cap, piston, nut and rod must be accurately positioned and properly supported during the application of axial force if the final assembly is to be properly made. In order to accomplish this, the invention uses the pressure tube 11 as a locating means. Further, the staking tool 13 is used as a locating means cooperable with the tube and also as a support means for the assembly. Thus, prior to the application of force to the assembly of the cap, piston and rod, these elements are inserted in the tube 11. The staking tool 13 has a shank 15 that also fits the tube 11 and a shoulder 16 that supports the tube so that by placing the tube 11 with the workpieces therein on the tool shank 15, the axis of rod 5 is aligned with the axis of the tool.

The shank of the staking tool 12 is pivotally supported at 17 in the bifurcated end 19 of a shaft 21. The shaft 21 has threaded engagement at 23 with the frame 25 so that by rotation thereof the height of the staking tool 13 can be varied. It will be recognized that axial force applied to the staking tool 13 will therefore be transmitted to the frame 25.

The requisite axial force for assembly purposes is supplied by a ram or plunger 27 that is slidably supported in the overhang 29 of the frame 25 and is coaxial with the shaft 21. The plunger 27 may have a bottom pad 31 which is suitably recessed at 33 to fit the cap 1.

The preferred means for moving the plunger 27 includes an air cylinder 35 that has the usual reciprocal piston therein and rod 37 extending outside the cylinder. A linkage system operatively connects the rod 37 to the plunger 27 and serves to magnify the force and therefore reduce the size of the plunger moving mechanism. This system includes a pair of diverging links 39 and 41 which are each pivoted at one end to the rod 37 as shown at 43. The lower link 39 is pivoted at its other end to the block 45 which is fixedly secured to the frame upright 47. Since the link 39 has a fixed pivot, the pivot 43 and thus the end of piston rod 37 must move in a predetermined orbit. In order to accommodate this movement of the piston rod 37, the cylinder 35 is pivoted at 49 in a bracket 51 that is fixedly secured to a frame member 53. The upper link 41 is pivoted to the lower end of a rod 55 that is slidably supported in one end of the overhang bracket 29. A cross link 57 is pivoted at a central portion 59 to the overhang bracket 29 and at one end to the rod 55 as indicated at 61. The other end of the cross link 57 is pivoted at 62 to an adapter fitting 63 that is threaded into the plunger 27 as shown at 65 so as to vary the effective length thereof.

The pressure cylinder 35 may be controlled in any suitable manner. If it is of the spring return type, there may be a pressure conduit 67 between one end of the cylinder and a control valve 69. The valve 69, which may be either hand or foot actuated, selectively connects the conduit 67 to either the pressure line 71 or the exhaust line 73.

The pivotal connection 17 enables the tool 13 to be moved forwardly so that its axis passes in front of the forward end of the overhang 29. A cross bar 75 on the bifurcated shaft end 19 serves to limit forward pivotal movement of the tool. With the tool 13 in the forward position as indicated by dotted lines in Fig. 1, the preliminary assembly of tube 11 and rod 5 with the cap 1 and piston 3 may be easily slipped on to the tool shank 15. This may then be pivoted toward the rear of the machine, i. e., clockwise in Fig. 1 to bring the cap 1 into alignment with the recess 33 of the plunger pad 21. Alignment with the plunger 27 is insured by a locating block 77 which is affixed to the upright 47 and has a V centering recess 79 that serves to support and position the tube 11 so that the rod 5 is coaxial with the plunger 27 and tool 13. The valve 69 may then be actuated to energize the cylinder 35 and force the plunger 37 downward to apply compressive axial force to the cap 1. This forces the cap 1 to be pressed on to the upper end of the rod 5 and also the staking tool 13 to stake the nut 9 to the piston in a well known manner.

From the standpoint of actual production procedure in the manufacture of shock absorbers, it is most advantageous to carry out this invention in the manner described, viz., (1) assemble the rod, cap, piston, nut and tube in a preliminary manner, (2) place on the tool shank 13 and align with the plunger 27, (3) apply axial compression to press the cap 1 and stake the nut 9, and (4) remove the tube and rod assembly. However, in its broader aspects it will be recognized that the benefits of the invention will be obtained in large measure if the tube 11 is first slipped on the shank 15 and then the rod inserted or if the tube 11 forms an actual part of the machine, as by securing it to the tool 13, instead of a part of the shock absorber assembly. Other modifications will appear to those in the art hence it is not intended to limit the invention to the details shown and described.

What is claimed is:

1. Apparatus for attaching parts to opposite ends of a rod that is within a tube comprising a frame, a ram carried by the frame for applying axial compressive forces to the rod, a support carried by the frame and in axial alignment with the ram, said support including a radial shoulder forming a seat for the end of said tube and a portion projecting from said seat toward the ram and fitting within the tube to accurately align it with the axis of the ram, the end of said support within the tube and nearest said ram forming a seat for the end of the rod remote from said ram whereby the rod is confined between said ram and seat and held in alignment with the ram by said tube mounted on said support.

2. The invention set forth in claim 1 wherein said seat also forms a staking tool.

3. The invention set forth in claim 1 wherein the axis of ram movement is vertical and wherein said support is pivoted on the frame for limited movement away from said axis, said frame including a stop engageable with a tube mounted on the support for aligning the support with the axis.

KEITH R. THOMPSON.

References Cited in the file of this patent

UNITED STATES PATENTS

| Number | Name | Date |
| --- | --- | --- |
| 328,290 | Cooke et al. | Oct. 13, 1885 |
| 577,015 | Eshman | Feb. 16, 1897 |
| 799,229 | Fildes | Sept. 12, 1905 |
| 1,104,088 | Wales | July 21, 1914 |
| 1,677,860 | Ferris | July 17, 1928 |
| 1,805,124 | Wilcox | May 12, 1931 |
| 1,877,004 | Menzl | Sept. 13, 1932 |
| 2,172,909 | Johnson | Sept. 12, 1939 |
| 2,177,191 | Sandberg | Oct. 24, 1939 |
| 2,278,293 | Watson | Mar. 31, 1942 |
| 2,372,029 | Stair | Mar. 20, 1945 |